United States Patent
Stastny et al.

(10) Patent No.: US 8,375,548 B2
(45) Date of Patent: Feb. 19, 2013

(54) FUEL NOZZLE AND METHOD OF REPAIR

(75) Inventors: Honza Stastny, Georgetown (CA);
Bhawan B. Patel, Mississauga (CA);
John Greer, Oakville (CA);
Parthasarathy Sampath, Mississauga (CA)

(73) Assignee: Pratt & Whitney Canada Corp., Longueuil, Quebec ( * ) Notice: Subject to any disclaimer, the term of this patent is extended or adjusted under 35 U.S.C. 154(b) by 698 days.

(21) Appl. No.: 12/574,841

(22) Filed: Oct. 7, 2009

(65) Prior Publication Data
US 2011/0079667 A1    Apr. 7, 2011

(51) Int. Cl.
*B23P 6/00* (2006.01)

(52) U.S. Cl. .............. 29/402.08; 29/402.14; 29/890.142; 60/748

(58) Field of Classification Search ............... 29/402.08, 29/402.14, 890.142; 60/740, 748
See application file for complete search history.

(56) References Cited

U.S. PATENT DOCUMENTS

| | | | |
|---|---|---|---|
| 2,575,889 A | 11/1951 | Oulianoff |
| 2,752,753 A | 7/1956 | Dooley |
| 4,216,652 A | 8/1980 | Herman et al. |
| 5,117,637 A | 6/1992 | Howell et al. |
| 5,671,597 A | 9/1997 | Butler et al. |
| 6,415,610 B1 | 7/2002 | Parker |
| 6,449,952 B1 | 9/2002 | Emilianowicz et al. |
| 6,581,386 B2 | 6/2003 | Young et al. |
| 6,895,761 B2 | 5/2005 | Mitchell et al. |
| 7,104,066 B2 | 9/2006 | Leen et al. |
| 7,237,730 B2 | 7/2007 | Prociw et al. |
| 7,246,494 B2 | 7/2007 | Currin et al. |
| 2006/0174631 A1 | 8/2006 | Parker |

*Primary Examiner* — Alexander P Taousakis
(74) *Attorney, Agent, or Firm* — Norton Rose Canada LLP

(57) ABSTRACT

A method of repairing a modular gas turbine fuel nozzle tip, having a fuel-conveying body and an annular cap fastened to the body by at least two fasteners, includes removing the fasteners, replacing the annular cap with a replacement annular cap, and interconnecting the replacement annular cap and the body using new fasteners.

11 Claims, 4 Drawing Sheets

FUEL NOZZLE AND METHOD OF REPAIR

TECHNICAL FIELD

The technical field generally relates to fuel nozzles, such as those for use in gas turbine engines.

BACKGROUND

Gas turbine engine fuel nozzles can be both difficult and costly to manufacture. Prior attempts to reduce manufacturing costs have resulted in fuel nozzles having two piece tips. By using a two piece fuel nozzle tip, the machining, drilling and finishing operations required to manufacture such fuel nozzles are simplified. Difficulties arise, however, when processes such as brazing or sintering are used to fasten the two nozzle pieces together. Under certain operating conditions, the brazing or sintering may weaken and/or break and subsequent repair may be difficult, costly or impractical. Hence, opportunities for cost reduction and increased versatility of fuel nozzle tips do yet exist.

SUMMARY

There is provided a method of repairing a modular gas turbine fuel nozzle tip, the method comprising: providing the fuel nozzle tip having a fuel-conveying body and an annular cap fastened to the body by at least two fasteners; removing the at least two fasteners from the annular cap and the body; removing the annular cap from the body; positioning a replacement annular cap against the body in place of the removed annular cap; and interconnecting the replacement annular cap and the body using new fasteners, thereby fastening the replacement annular cap to the body.

There is also provided a modular fuel nozzle tip for a gas turbine engine, the nozzle tip comprising: a body defining one or more fuel conveying passages extending between an inlet end and an outlet end of the body, the outlet end having a head portion with a peripheral end surface, the head portion having web portions extending radially therefrom, and at least two projections extending from the end of said web portions; an annular cap having a radially inner shoulder surface interfacing with the peripheral end surface of the body, the peripheral end surface and the shoulder surface defining a plurality of air channels extending through the head portion of the modular fuel nozzle tip; and at least two fasteners fastening the annular cap to the body, each fastener extending through the annular cap and into one of the projections.

There is further provided a method of manufacturing a modular fuel nozzle tip for a gas turbine engine, the method comprising: providing a fuel-conveying body having a head portion containing a plurality of circumferentially spaced apart web portions separated by air channels extending through the head portion, each of said web portions having an axial projection extending upstream from a peripheral end surface of the head portion; providing a separately-formed annular cap; abutting the annular cap against the head portion of the fuel-conveying body, such that the axial projections are disposed radially inwardly from said annular rim of the annular cap; and fastening the annular cap in place on the fuel-conveying body using two or more fasteners, the fasteners radially extending through the annular cap and into the axial projections of the web portions.

DESCRIPTION OF THE DRAWINGS

Reference is now made to the accompanying figures, in which.

DETAILED DESCRIPTION OF THE PREFERRED EMBODIMENTS

Figure 1:
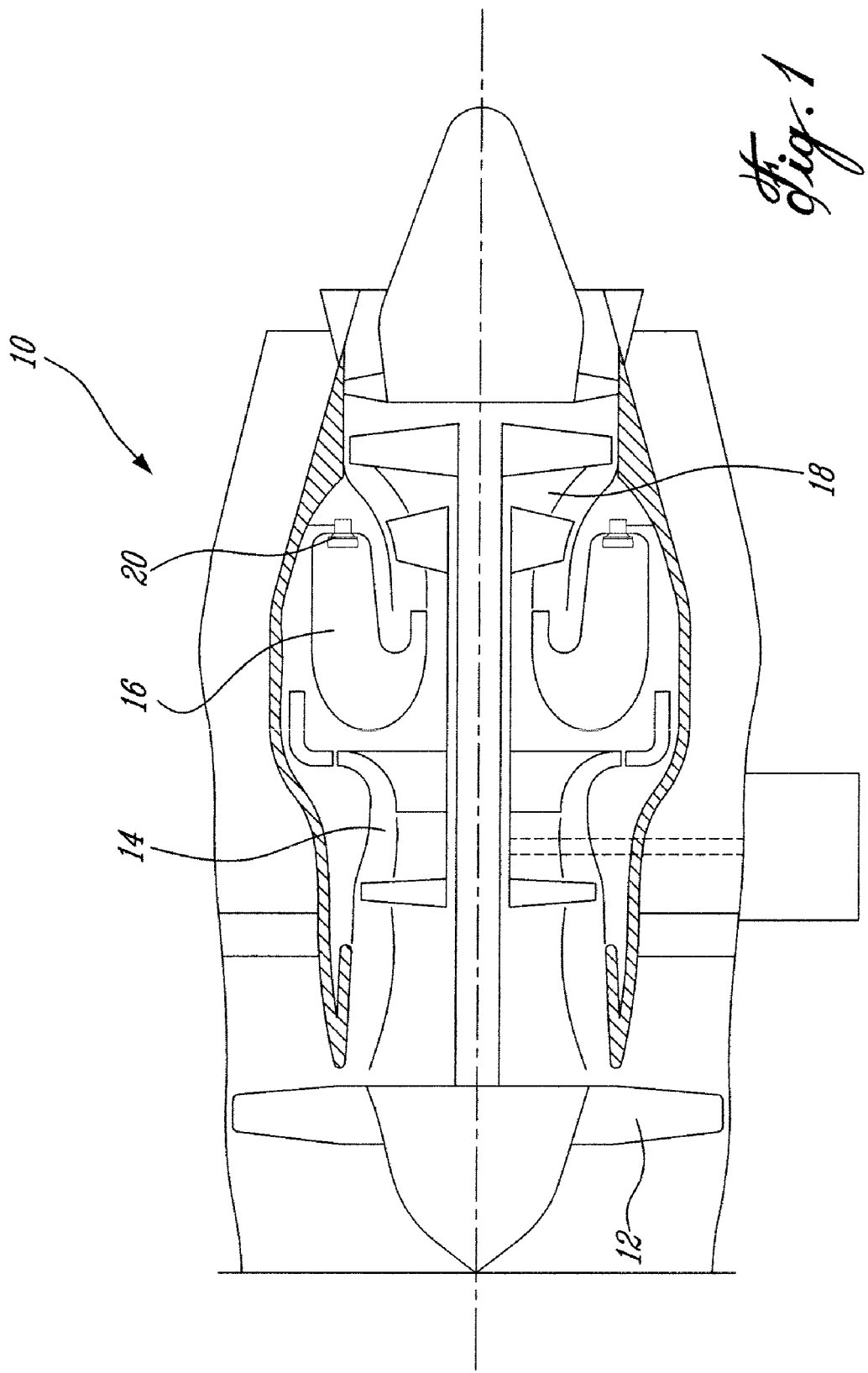
FIG. 1 is a schematic axial cross-section view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The fuel is supplied to the combustor 16 via fuel nozzles whereby it is also mixed with the compressed air flowing through the fuel nozzle tips. It will be understood however that the invention is equally applicable to other types of gas turbine engines such as a turbo-shaft, a turbo-prop, or auxiliary power units.

Figure 2:
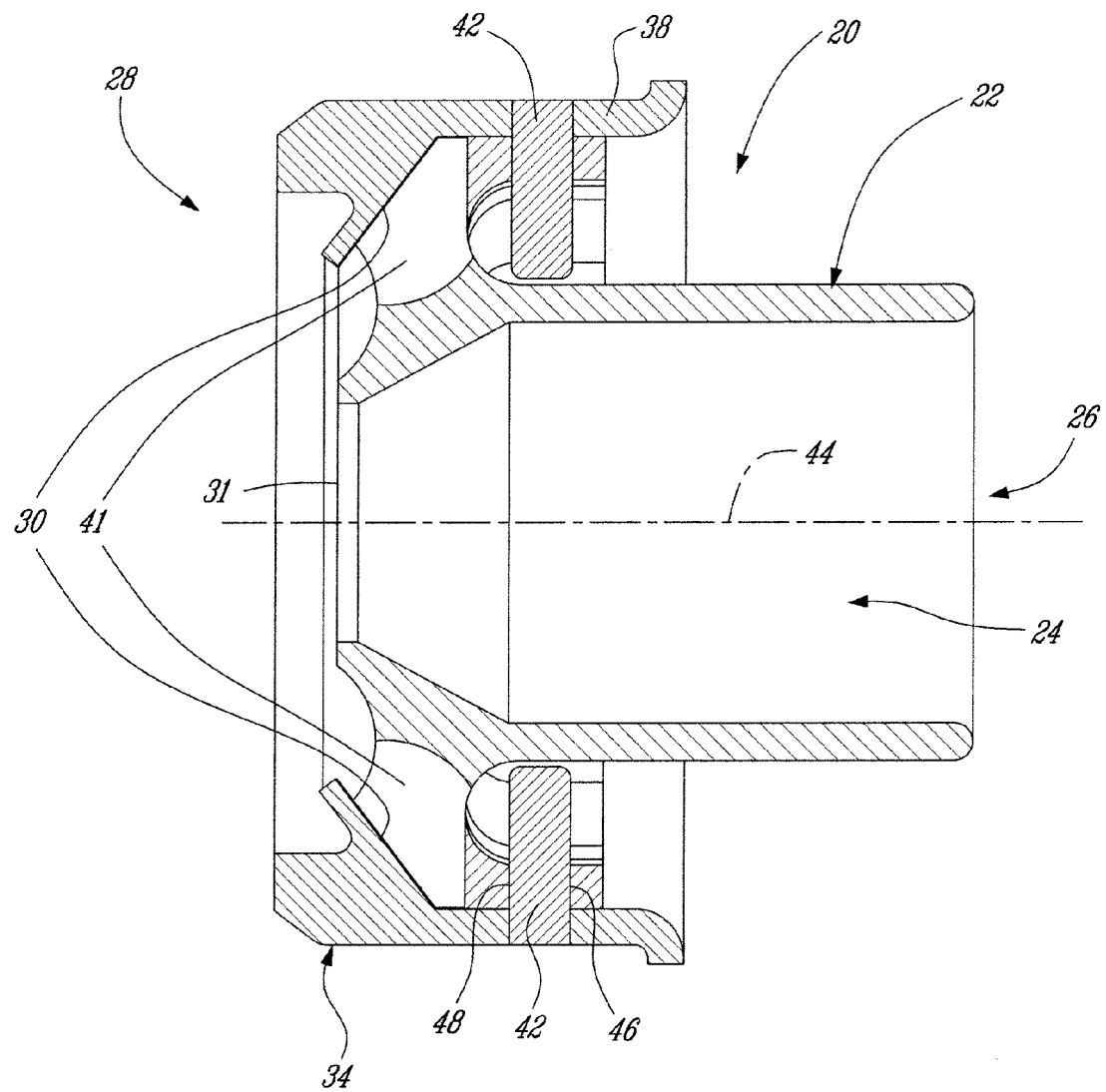
FIG. 2 is an axial cross-section view of the present fuel nozzle tip.

A modular fuel nozzle tip is generally shown at 20, as seen in general on FIG. 1 and in detail on FIG. 2. The nozzle tip comprises two main components, a body 22 and an annular cap 34, as best seen on FIG. 3. The annular cap 34 is fastened to the body 22 with the use of fasteners 42, as seen on FIG. 2.

Figure 3:
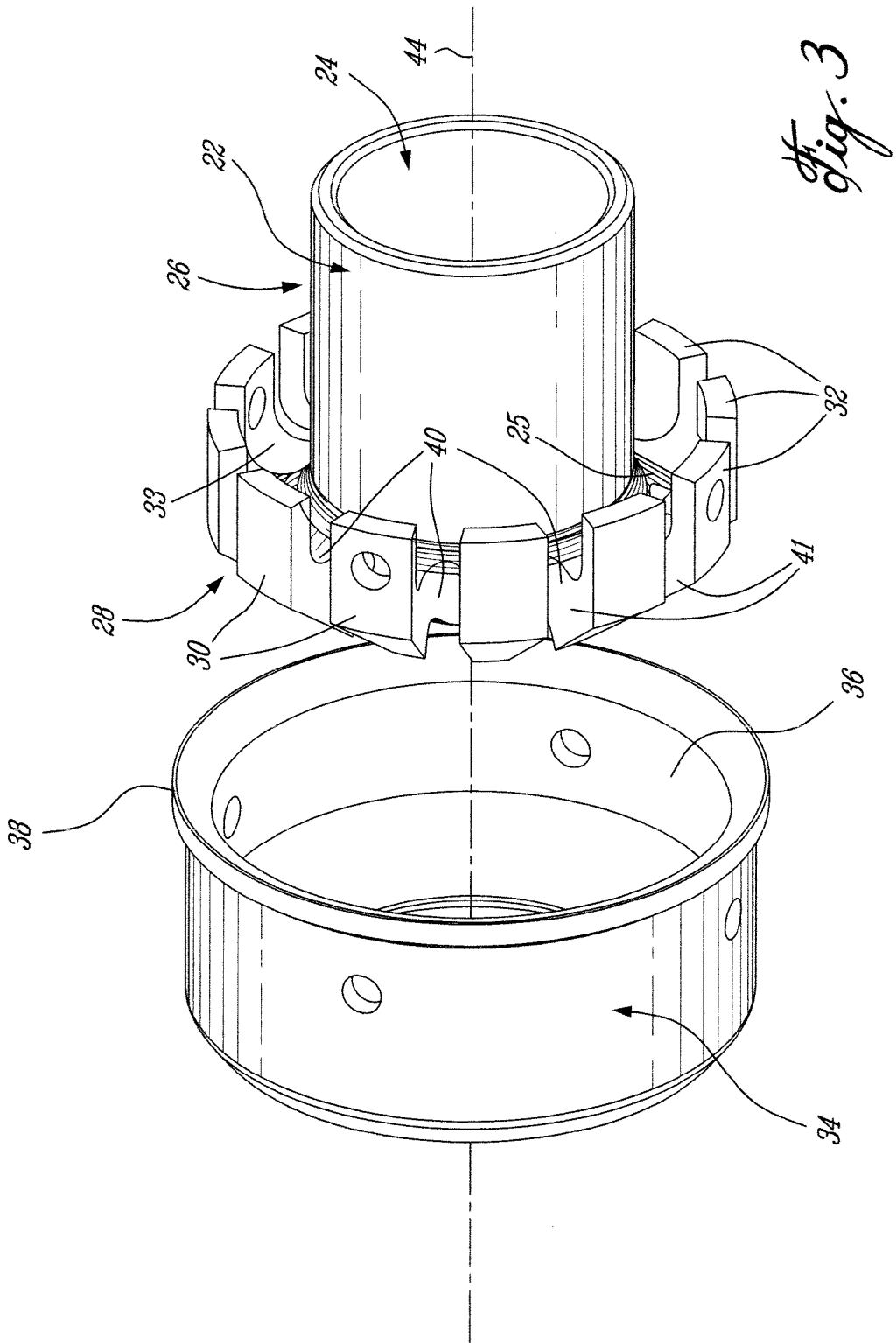
FIG. 3 is an isometric rear view of the fuel nozzle tip of FIG. 2.
Figure 4:
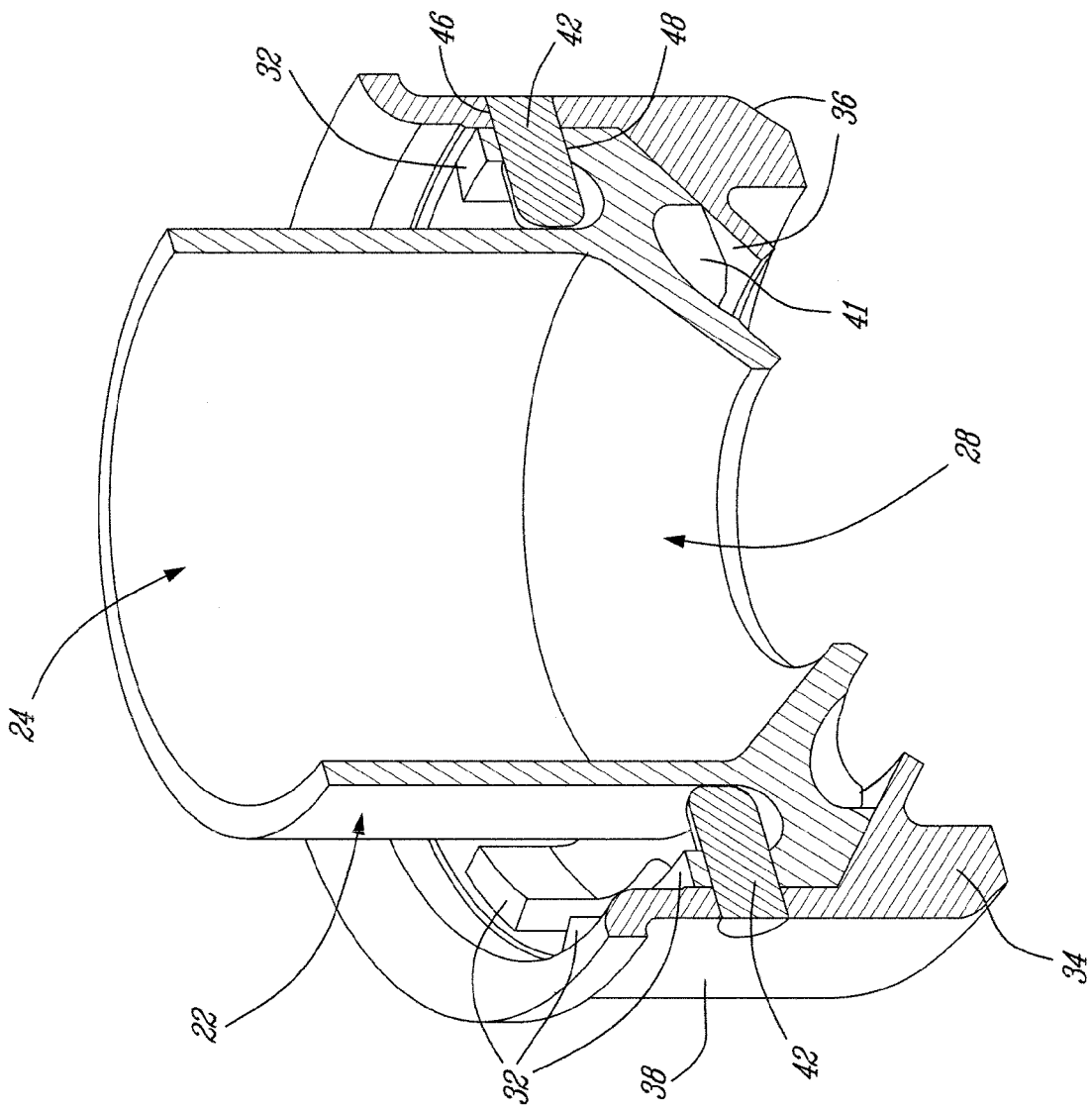
FIG. 4 is a perspective cross-section view of the fuel nozzle tip of FIG. 2.

Referring now to FIG. 2-4, the body 22 defines a central passage generally shown at 24 extending between an inlet end generally shown at 26 and an outlet end generally shown at 28. The central passage 24 may be adapted to receive a fuel delivery probe or a number of suitable fuel delivery conduits, connected to a fuel supply (not shown). The outlet end 28 of the body 22 comprises a head portion 25 with a peripheral end surface 30 surrounding a spray orifce, generally shown at 31, of the central passage 24. The head portion 25 comprises a plurality of projections 32, which will be explained in greater detail below.

The annular cap 34 circumscribes the spray orifice 31 of the body 22 and has a shoulder surface 36 interfacing with the peripheral end surface 30 of the head 25. The annular cap 34 further comprises an annular rim 38 extending beyond the shoulder surface 36 and rearward towards the inlet end 28 of the body 22, the annular rim 38 being concentric with, but radially spaced apart from, the body 22 and substantially parallel to the central axis 44 of the central passage 24. The central axis 44 is a longitudinal central axis of the entire modular fuel nozzle tip. The term "substantially parallel" used herein is intented to encompass an orientation which is approximately, but not necessarily exactly, parallel to the central axis 44 of the central passage 24.

The peripheral end surface 30 of the head 25, and the shoulder surface 36 of the cap 34 define a plurality of through air channels generally shown at 40, at the interface between the cap 34 and the head 25, as best seen on FIG. 3. The channels 40 extend substantially radially about the spray orifice 31. the air channels 40 extend through the fuel nozzle tip 20 and are defined by circumferentially distributed through slots 41 extending across the peripheral end surface 30 of the head 25 and the shoulder surface 36 of the annular cap 34. The air channels 40, with their circumferentially spaced apart arrangement, result in web portions 33 disposed circumferentially therebetween, the web portions extending substantially radially from the head 25 of the body 22. The air channels 40 are used to deliver air into the combustor 16 and also to interact with fuel as it exits the spray orifice 31. The air channels 40 may be oriented to also comprise a tangential and/or axial componet in relation to the central passage 24 so as to promote atomization of the fuel and/or induce a swirling motion of the air/fuel mixture as it enters the combustor 16. Accordingly, the term "substantially radially" used herein is intended to encompass orientations that have a radial component but that may not necessarily be purely radial.

A plurality of projection 32 are integrally formed with the web portions 33 of the body 22 and extend axially towards the inlet end 26 of the body 22, while being substantially parallel to the central axis 44 of the fuel nozzle tip 20. These projections 32 may also be referred to as "fingers". In a possible embodiment, the projections 32 have a circumferential width which is equal to the circumferential width of the web portions 33.

The cap 34 and the body 22 are manufactured as separate parts and are subsequently assembled and fastened together by at least two fasteners 42 to form the fuel nozzle tip 20. In order to fasten the cap 34 to the body 22, at least two diametrically opposed tight tolerance holes 46 are made, using for example a drill although various other means may also be used to make th holes 46 in the annular rim 38 of the cap 34. Similarly, at least two diametrically opposed projections 32 of the head 25 are chosen and one tight tolerance hole is made in each of these projections, which yields at least two diametrically opposed tight tolerance holes 48 in the projection 32.

Once the holes in the rim and the holes in the projections are formed, the shoulder surface 36 of the cap 34 is placed against the outlet end of the 22 and in so doing, the shoulder surface 36 interfaces with the peripheral end surface 30 of the head 25. Simultaneously, the holes 46 in the annular rim 38 and the holes 48 in the projections 32 are circumferentially aligned. This circumferential alignment forms a plurality of pairs of holes, each pair comprising one hole 46 in the rim and one hole 48 in a finger. A fastener 42 is then inserted in each pair of said holes 46 in the rim and said holes 48 in the projections. These fasteners provide an interconnection between the cap 34 and the body 22, which fastens the cap 34 to the body 22. In addition, the use of fasteners provides a mechanical connection between the cap 34 and the body 22, ensuring that the two pieces will not separate under engine operating conditions.

In one possible embodiment, the cap 34 is first placed against the body 22 and two diametrically opposed holes are subsequently made through the annular rim 38 and through two diametrically opposed projections of the body 22, thus simultaneously forming the holes 46 in the rim 38 and the holes 48 in the projections 32. In another possible embodiment, the cap 34 is first press fit onto the head 25 of the nozzle body 22, prior to the forming of the holes. This is made possible because the peripheral end surface 30 has a frustro-conical configuration, which provides self-centering of the cap 34 and body 22.

To ensure minimal movement in the fasteners 42, the fasteners 42 may additionally be subsequently brazed into place. Because braze does not flow into tight fit joints, the braze will not flow between the body 22 and the cap 34, but will only be present around the fasteners. The fastener 42 may then be machined to be flush with the cap, so as to not protrude outside of said cap.

In the particular embodiment described herein, the fasteners are comprised of dowel type pins, although various other fasteners, pins or means of mechanical connection between the annular rim and the projections may be used in place of a dowel type pin, such as for example a key, a rivet or a threaded fastener.

An advantage of using projections to connect the cap to the body is that the projections help reduce thermal differential growth and also provide sufficient flexibility to limit thermal stresses to an acceptable level, compared to previous methods of securing the cap to the body. These advantages contribute towards a longer fatigue life for the fuel nozzle tip 20.

Another advantage of the fuel nozzle tip 20 is repairability thereof. During the course of fuel nozzle operation, the annular cap 34 may become damaged, due to fretting or oxidation for example. The use of a fastener as a connection element and the modular nature of the fuel nozzle tip 20 permit the cap 34 to be replaced or repaired independently from the body. To remove the cap 34, the fasteners 42 may be drilled out, or removed by other means, from the annular rim 38 and the projections 32. Such other means can include machining operations, such as milling, electro-discharge machining (EDM), or alternatively chemical or electro-chemical material removal processes. The annular cap 34 may then be removed from the body 22 and a replacement cap may be used in its place. The replacement annular cap may comprise the same, previously used, cap 34 which is repaired, or may comprise a new, previously unused, cap 34. New holes 46 may then be drilled through the annular rim of the replacement cap, if holes are not already provided in this replacement cap. During the repair of the fuel nozzle tip 20, it may be necessary to make new holes 48 in the projections 32 of the body 22. In such a case, new projections 32, which previously had been devoid of holes, may be chosen, and holes 48 will subsequently be made in them. A person skilled in the art will recognize that this pertains to one embodiment of this fuel nozzle tip, and that in another embodiment, it is possible to drill a new hole through an existing hole of a finger, if said new hole is larger than said old one. The replacement cap may then be positioned against the body 22 and the holes 46 in the annular rim 38 of the replacement cap may then be circumferentially aligned with the holes 48 in the projections 32 of the body 22. New fasteners 42 may then be used, such that each new fastener 42 is then inserted through one of the holes 46 of the rim 38 of the replacement cap and through a hole 48 of one of the projections 32 of the body 22, thus fastening the new cap to the previously-used body 22. The fasteners 42 may then be brazed as previously done in order to minimize any possible movement.

It should be noted that the fuel nozzle tip 20 should comprise at least two holes 46 and at least two holes 48, so as to enable the use of at least two fasteners 42, however more holes 46 in the rim and more holes 48 in the projections may be formed if desired, thus enabling more fasteners 42 to fasten the cap 34 to the body 22.

Both the cap 34 and the body 22 may be manufactured using metal injection molding (MIM) techniques out of the same or different materials depending on the mechanical properties and high temperature properties that are desired for each part. The material for the cap 34 may be selected so as to more efficiently withstand the harsh environment inside the combustor 16 in comparison with the body 22. In addition to material costs, a person skilled in the art will recognize that tooling costs may be reduced by producing the cap 34 and the body 22 separately in comparison with a unitary nozzle. In the modular case, the body 22 does not have to be replaced as often as the cap 34. The use of a pin as a fastening means between the cap and the body permits a method of repair, wherein only the manufacture of a new cap is needed in order to repair the fuel nozzle tip 20, as opposed to replacing both the cap and the body. This enables repair costs to be reduced compared to the traditional method of repair, wherein the whole fuel nozzle tip had to be replaced. In addition, because the two parts of the fuel nozzle tip are produced separately, simpler tooling may be used. For example, forming the slots 41 on the body 22 as opposed to through channels in a unitary nozzle significantly reduces the complexity of the moulds required for MIM.

Although in this embodiment, the projections 32 of the body 22 and the annular rim 38 of the cap 34 extend axially towards the inlet end of the body while being parallel to the central axis 44 of the central passage 24, it should be noted that their particular direction may change, without departing from the scope of the invention disclosed. For example, the projections 32 and the annular rim 38 may extend at an angle relative to the central axis 44 of the central passage 24 of the body 22, the angle ranging between 0 to 90 degrees, so long as they are in abutment with each other and permit the drilling of holes 46 in the rim and holes 48 in the projections therethrough, for receiving a fastener 42.

The above description is meant to be exemplary only, and one skilled in the art will recognize that changes may be made to the embodiments described without departing from the scope of the invention disclosed. For example, it is apparent that the present modular nozzle configuration could be applied to simplex or duplex air-assisted nozzles, to fuel nozzles mounted to internal fuel manifolds or having stems, etc. Still other modifications which fall within the scope of the present invention will be apparent to those skilled in the art, in light of a review of this disclosure, and such modifications are intended to fall within the appended claims.

The invention claimed is:

1. A method of repairing a modular gas turbine fuel nozzle tip, the method comprising:
providing a fuel nozzle tip having a fuel-conveying body and an annular cap circumscribing only the outlet end of said body and fastened to an outlet end of said body by at least two circumferentially distributed fasteners;
removing the at least two fasteners from the annular cap and the body;
removing the annular cap from the body;
positioning a replacement annular cap against the body in place of the removed annular cap; and
interconnecting the replacement annular cap and the body using new fasteners, thereby fastening the replacement annular cap to the body.

2. The method according to claim 1, wherein the step of removing the at least two fasteners further comprises machining out the at least two fasteners.

3. The method according to claim 2, wherein machining out the at least two fasteners further comprises of machining an area which is greater than a cross-sectional area of the at least two fasteners, such that the at least two fasteners are removed from the annular cap and from the body and holes of a cross-sectional area greater than the cross-sectional area of the at least two fasteners, are formed in the body.

4. The method according to claim 1, wherein the step of positioning the replacement annular cap further comprises forming at least two diametrically opposed holes in the replacement annular cap and at least two diametrically opposed holes in the body.

5. The method according to claim 1, wherein the step of positioning the replacement annular cap further comprises positioning the replacement annular cap on the body and simultaneously forming one of at least two diametrically opposed holes in the replacement annular cap and one of at least two diametrically opposed holes in the body.

6. The method according to claim 4, wherein the step of positioning a replacement annular cap against the body further comprises circumferentially aligning the at least two diametrically opposed holes in the body with the at least two diametrically opposed holes in the replacement annular cap.

7. The method according to claim 6, wherein the step of interconnecting the replacement annular cap and the body further comprises inserting each said new fastener into both one of the diametrically opposed holes of the replacement annular cap and one of the diametrically opposed holes of the body, thereby fastening the replacement annular cap to the body.

8. The method according to claim 1, wherein the replacement annular cap has an annular rim extending from a frontal portion of said replacement annular cap and wherein the step of interconnecting the replacement annular cap and the body further comprises inserting the new fasteners through said annular rim.

9. The method according to claim 1, wherein the body has a plurality of projections and wherein the step of interconnecting the replacement annular cap and the body further comprises inserting the new fasteners into said projections.

10. The method according to claim 1, wherein the step of removing the annular cap from the body further comprises repairing the annular cap and subsequently using the repaired annular cap as the replacement annular cap.

11. The method according to claim 1, wherein the step of removing the annular cap from the body further comprises manufacturing a new annular cap and subsequently using said new annular cap as the replacement annular cap.

\* \* \* \* \*